United States Patent [19]

Machida et al.

[11] Patent Number: 5,109,436

[45] Date of Patent: Apr. 28, 1992

[54] IMAGE DATA PROCESSING SYSTEM WITH ADAPTIVE BINARY QUANTIZATION

[75] Inventors: Hironobu Machida, Yokohama; Hitoshi Yoneda, Kawasaki; Hiroki Kanno, Yokohama, all of Japan

[73] Assignee: Kabushiki Kaisha Toshiba, Kawasaki, Japan

[21] Appl. No.: 486,764

[22] Filed: Mar. 1, 1990

[30] Foreign Application Priority Data

Mar. 28, 1989 [JP] Japan ................................. 1-76056

[51] Int. Cl.⁵ .............................................. G06K 9/38
[52] U.S. Cl. .......................................... 382/50; 382/9; 358/466; 358/462
[58] Field of Search ................... 382/50, 9, 52, 53; 358/457, 456, 466, 462

[56] References Cited

U.S. PATENT DOCUMENTS

| | | | |
|---|---|---|---|
| 4,425,582 | 1/1984 | Kadakia et al. | 358/260 |
| 4,547,811 | 10/1985 | Ochi et al. | 358/280 |
| 4,554,593 | 11/1985 | Fox et al. | 358/282 |
| 4,630,124 | 12/1986 | Endoh et al. | 358/260 |
| 4,633,327 | 12/1986 | Roetling | 358/283 |
| 4,701,807 | 10/1987 | Ogino | 358/284 |
| 4,723,173 | 2/1988 | Tanioka | 358/282 |
| 4,853,792 | 8/1989 | Katsuta et al. | 358/455 |
| 4,893,188 | 1/1990 | Murakami et al. | 358/456 |
| 4,958,238 | 9/1990 | Katayama et al. | 358/456 |
| 4,977,605 | 12/1990 | Fardeau et al. | 382/51 |

FOREIGN PATENT DOCUMENTS

0070161  1/1983  European Pat. Off. ............. 382/50

Primary Examiner—Leo H. Boudreau
Assistant Examiner—Andrew W. Johns
Attorney, Agent, or Firm—Finnegan, Henderson, Farabow, Garrett, and Dunner

[57] ABSTRACT

An extractor extracts, from image data to be binarized, a feature amount of a target pixel including at least a maximum density difference among pixels in a local region including the target pixel. A predictor predicts an image type of the target pixel in accordance with a minimum density value among the pixels in the local region. A selector selects one of the feature amount of the target pixel from the extractor and a feature amount obtained by adding the feature amount of the target pixel to feature data of neighboring pixels in accordance with the image type predicted by the predictor. A discriminator discriminates the image type of the target pixel in accordance with the feature amount selected by the selector. A weighting section weights the discrimination result from the discriminator with respect to the neighboring pixels of a predetermined range preceding the target pixel in accordance with distances from the target pixel to the neighboring pixels so as to generate feature data of the neighboring pixels selectively used by the selector. A determinator adaptively determines a threshold value for binarizing the image data in accordance with the discrimination result. A binarizing section binarizes the image data in units of target pixels by using the threshold value determined by the determinator.

19 Claims, 7 Drawing Sheets

|   |   |   |   |   |
|---|---|---|---|---|
| 1 | 1 | 1 | 0 | 0 |
| 1 | 1 | 1 | 0 | 0 |
| 1 | 1 |   |   |   |

FIG. 11A

| A11 | A10 | A09 | A08 | A07 | A06 | A05 | A04 | A03 | A02 | A01 | A00 |
|-----|-----|-----|-----|-----|-----|-----|-----|-----|-----|-----|-----|
| 1 | 1 | 0 | 0 | 1 | 1 | 1 | 0 | 0 | 1 | 1 | 1 |
| C ||||  E |||| 7 ||||

IMAGE DATA PROCESSING SYSTEM WITH ADAPTIVE BINARY QUANTIZATION

BACKGROUND OF THE INVENTION

1. Field of the Invention

The present invention generally relates to an image processing system and, more particularly, to an image data processing system for performing binary quantization of image data of a document on which different types of images, such as characters and photographs, are formed together.

2. Description of the Related Art

Recently, an image processing apparatus, such as a document image processing apparatus, capable of processing image data as well as code data has been developed. In this apparatus, image data such as document images read by a read means, e.g., a scanner, image data, such as characters and drawings having contrast are processed by simple binary quantization using a fixed threshold value, whereas image data such as photographs having gradation are subjected to gradation binary quantization by a pseudo-gradation means such as a dither method. The above methods are selectively employed for the following reasons. If image data are uniformly processed by simple binary quantization using the fixed threshold, the resolution of regions comprised of characters, drawings, and the like is preserved, and hence no degradation in image quality occurs upon image reproduction. In regions comprised of photographs and the like, however, the gradation is not preserved, and hence degradation in image quality occurs in a reproduced image. In contrast to this, if the image data is uniformly processed by gradation binary quantization using an ordered dither method or the like, the gradation of regions comprised of photographs and the like is preserved, and hence no degradation in image quality occurs upon image reproduction. In regions comprised of characters, drawings, and the like, however, the resolution is decreased, and hence degradation in image quality occurs in a reproduced image.

As described above, if binary quantization of image data is performed by one binary quantization technique, it is impossible to obtain a reproduced image which can satisfy image quality of both types of regions, i.e., a character drawings region and a photographic region. Therefore, an adaptive processing technique is indispensable for document image processing. In this technique, image data including different types of images are separated into regions in accordance with the feature of each image, and adaptive processing is performed for each region. This can be applied to other types of image processing. For example, if image processing is not performed in accordance with the feature of an image degradation in image quality occurs in enlargement/reduction processing of the binarized image. Furthermore, in a coding process, if an image is processed by a compression scheme which is not suitable for the feature of the image, data compression cannot be efficiently performed.

As disclosed in, e.g., Published Unexamined Japanese Patent Application No. 58-3374, therefore, a binary quantization system which can satisfactorily maintain both the resolution and gradation levels of character and photographic portions has been proposed. In this system, maximum density differences $\Delta Dmax$ of image density in local regions on an image surface, and the maximum density differences $\Delta Dmax$ are compared with a determination threshold value T so as to divide the entire image into character/drawing regions and photographic regions, thereby switching binary quantization methods in accordance with the feature of each image region. In this case, the term "density" represents the signal level of an image read by a read means and hence differs from its general meaning. The term "density" will be used in this meaning hereinafter unless otherwise specified.

Figure 12:
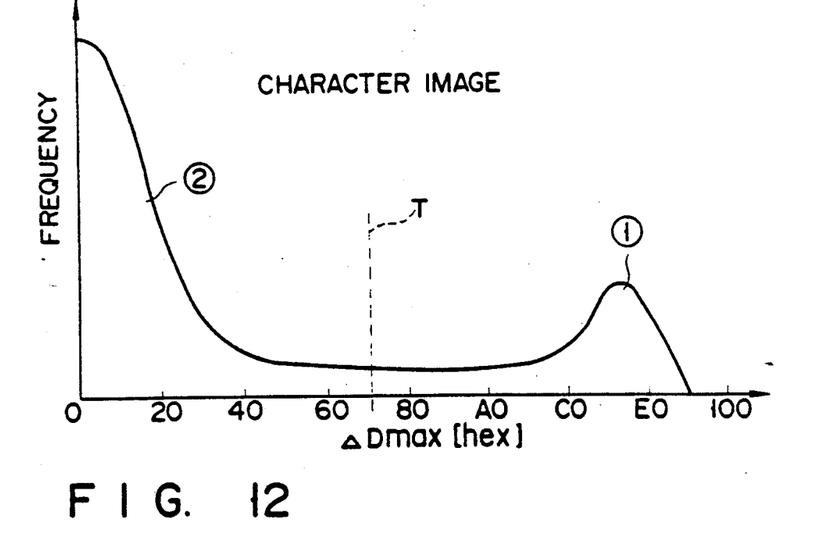
FIG. 12 is a graph for explaining a typical frequency distribution of maximum density differences of a character image in a conventional technique.
Figure 13:
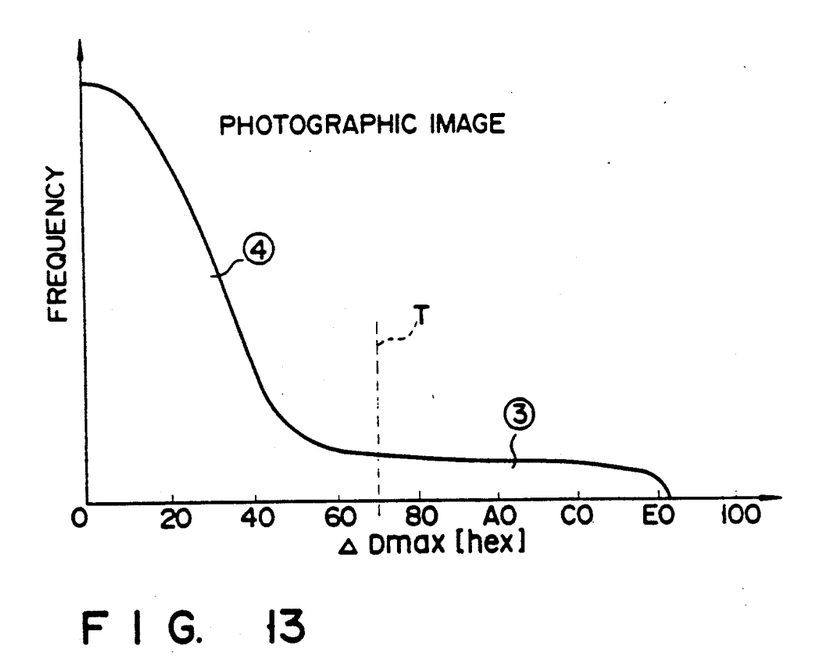
FIG. 13 is a graph for explaining a typical frequency distribution of maximum density differences of a photographic image in the conventional technique.

In the above-described system, however, a photographic image region in which the density abruptly changes is mistaken for a character region, and as a result, the gradation is degraded upon reproduction. For example, assume that the dynamic range of an image density is constituted by 8 bits (0 to 255: 0 to FF [hex] in hexadecimal notation). In a character image, the frequency distribution of maximum density differences $\Delta Dmax$ exhibits peak values near 0 [hex] and FF [hex], as shown in FIG. 12. Pixels having values close to FF [hex] are pixels including an edge portion of a character within a predetermined area. All pixels, within a predetermined area, having values close to 0 [hex] are background pixels or pixels within a character portion including no edge portion. In a photographic image, since changes in density in local regions are relatively small, the maximum density differences $\Delta Dmax$ within a predetermined area are concentrated on values close to 0 [hex], as shown in FIG. 13.

Identification of image types is performed for the images having the frequency distributions of the maximum density differences $\Delta Dmax$ described above by using a predetermined threshold (T=70 [hex]) under the following conditions:

(1) If $\Delta Dmax > T$, a corresponding portion is identified as a character portion.

(2) If $\Delta Dmax \leq T$, a corresponding portion is identified as a photographic portion.

According to this method, when a character image is processed, it is properly determined that pixels having the maximum density differences $\Delta Dmax$ in a region indicated by ① in FIG. 12 are character pixels by condition (1). However, pixels having the maximum density differences $\Delta Dmax$ in a region indicated by ② in FIG. 12 are mistaken for pixels of a photographic graphic portion by condition (2). In contrast to this, when a photographic image is processed, it is properly determined that pixels having the maximum density differences $\Delta Dmax$ in a region indicated by ④ in FIG. 13 are photographic pixels by condition (2). However, pixels having maximum density differences $\Delta Dmax$ in a region indicated by ③ in FIG. 13 are mistaken for pixels of a character portion by condition (1). This determination error of the photographic image indicates that it is determined that pixels which are located in a predetermined area and exhibit an abrupt change in density, e.g., pixels of a profile portion of a face, are mistaken for character pixels. For this reason, in binary quantization, degradation in image quality of a reproduced image occurs due to degradation in gradation. Especially, in a photographic image, a whose density abruptly changes is visually conspicuous portion.

When identification of character/drawing portions and photographic portions is to be performed using the maximum density differences $\Delta Dmax$ as feature amounts, since pixels located within a predetermined area and including a region whose density change is large are mistaken for pixels of a character portion, image regions cannot be accurately separated. For this reason, binary quantization cannot be adaptively and accurately performed in accordance with the feature of each image. That is, the above-described method cannot contribute to optimal reproduction of an image which satisfies both the resolution and gradation of character and photographic portions.

SUMMARY OF THE INVENTION

It is, therefore, an object of the present invention to provide a new and improved image data processing apparatus in which when image data including different types of images are processed by binary quantization, image regions can be accurately separated by eliminating a determination error with respect to a region having a large variation in density of the halftone image regions such as photographic images, and binary quantization can be adaptively and accurately performed in accordance with the feature of each image, thereby contributing to obtain a reproduced image which satisfies both the resolution of image regions having contrast, such as character portions, and the gradation of image regions having gradation, such as photographic portions.

It is another object of the present invention to provide an image data processing method in which when image data including different types of images are to be processed by binary quantization, image regions can be accurately separated by eliminating a determination error with respect to a region having a large variation in density in halftone image region such as photographic images, and binary quantization can be adaptively and accurately performed in accordance with the feature of each image, thereby contributing to obtain a reproduced image which satisfies both the resolution of image regions having contrast, such as character portions, and the gradation of image regions having gradation, such as photographic portions.

According to one aspect of the present invention, there is provided an image data processing apparatus comprising:

means for extracting, from image data to be binarized, a feature amount of a target pixel including at least a maximum density difference among pixels in a local region including the target pixel;

means for predicting, from the image data to be binarized, an image type of the target pixel in accordance with a minimum density value among the pixels in the local region including the target value;

means for selecting one of the feature amount of the target pixel extracted by the extracting means and a feature amount obtained by adding the feature amount of the target pixel to feature data of neighboring pixels in accordance with the image type predicted by the predicting means;

means for discriminating the image type of the target pixel in accordance with the feature amount selected by the selecting means;

means for weighting a discrimination result from the discriminating means with respect to the neighboring pixels of a predetermined range preceding the target pixel in accordance with distances from the target pixel to the neighboring pixels so as to generate feature data of the neighboring pixels selectively used by the selecting means;

means for adaptively determining a threshold value for binarizing the image data in accordance with the discrimination result from the discriminating means and means for binarizing the image data in units of target pixels by using the threshold value determined by the determining means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiments given below, serve to explain the principles of the invention, in which.

DETAILED DESCRIPTION OF THE PREFERRED EMBODIMENT

An embodiment of the present invention will be described below with reference to the accompanying drawings.

Figure 1:
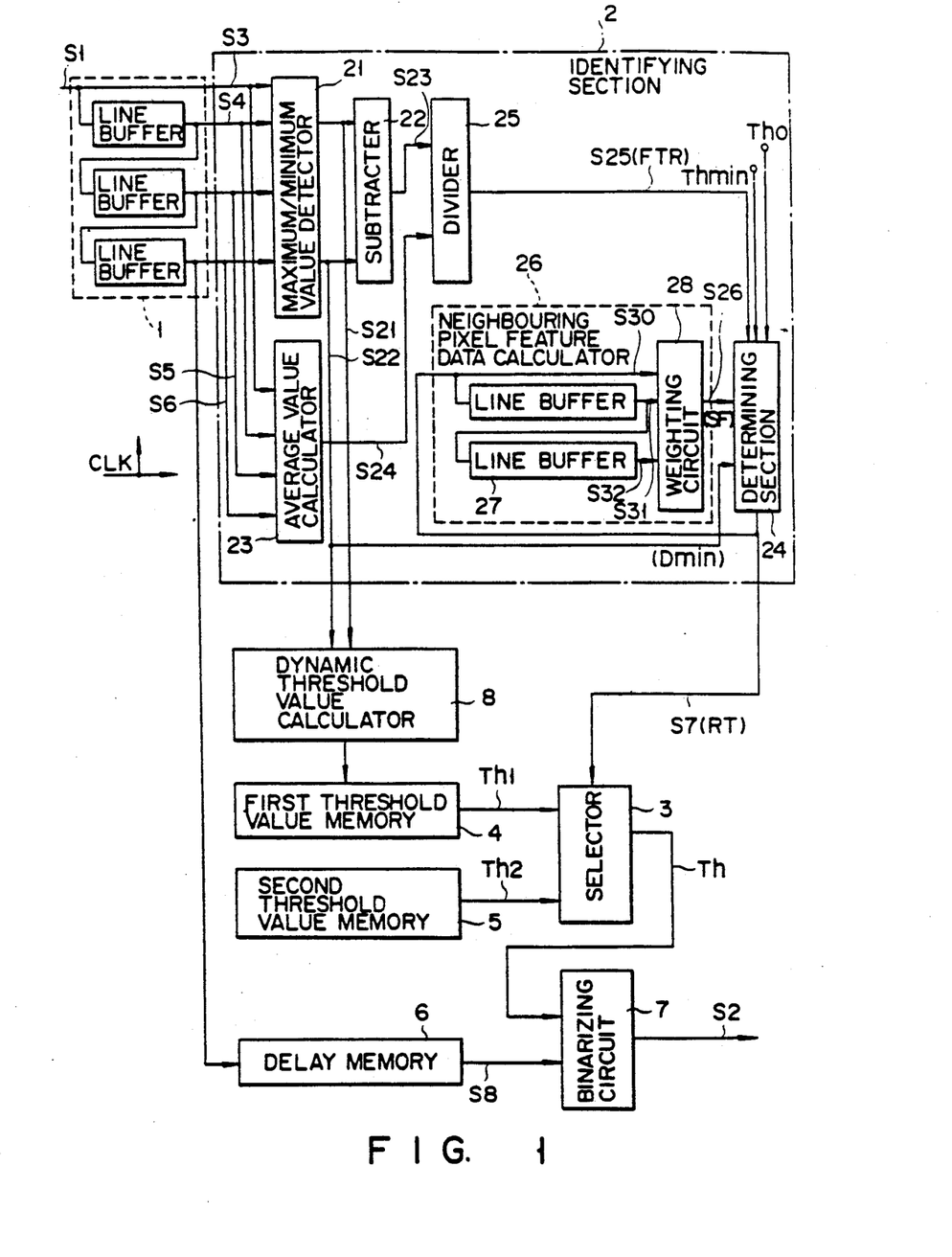
FIG. 1 is a block diagram showing an arrangement of an image data processing apparatus according to an embodiment of the present invention.

FIG. 1 is a block diagram showing an arrangement of an image data processing apparatus according to the present invention. This apparatus is designed to receive image data S1 as, e.g., 8-bit digital data per pixel, which is read by a reader unit such as image scanner, and to output a binary image signal S2, which is obtained by performing adaptive binary quantization of the received digital data, to, e.g., an image reproducing apparatus such as a digital printer (not shown). Line buffers 1 temporarily store the image data S1 in units of four lines. Image data S3 to S6 corresponding to these four lines are output for image data processing (binary quantization) to be described below.

An identifying section 2 has the following functions. The identifying section 2 receives the image data S3 to S6 corresponding to four lines from the line buffers 1 in synchronism with a predetermined clock. Section 2 then calculates, from the input image data S3 to S6, a maximum density Dmax, a minimum density Dmin, and an average density Da as image characteristic of a local region including a target pixel, and also calculates a maximum density difference $\Delta$Dn normalized by the average density Da. If the minimum density Dmin is larger than a predetermined threshold, section 2 determines that the possibility of a photographic pixel is high, and hence adds neighboring pixel feature data SF to the normalized maximum density difference $\Delta$Dn. This neighboring pixel feature data SF is obtained, as an image characteristic, by weighting the neighboring pixels of the target pixel with coefficients which are determined in accordance with the distances from the target pixel (to be described in detail later). In contrast to this, if the minimum density Dmin is smaller than the predetermined threshold value, section 2 determines that the possibility of a character pixel is high, and hence does not add the neighboring pixel feature data to the difference $\Delta$Dn. Finally, section 2 determines from a result of the above-described processing whether the image data of the local region has characteristics of a character portion or those of a photographic portion, and identifies an image type, thus outputting a selection control signal S7.

The selection control signal S7 (RT) from the identifying section 2 is supplied to a selector 3 and is used as a signal for switching first and second threshold values (to be described later). That is, either a first threshold value Th1 from a first threshold value memory 4 or a second threshold value Th2, such as a dither matrix, from a second threshold value memory 5 is selectively extracted as threshold value Th for binary quantization of the image signal data S1. Image data S8 is read from line buffer 1 and is delayed in a delay memory 6 by a predetermined timing. The delayed image data S8 is then supplied to a binarizing circuit 7 constituted by a comparator so as to be binarized by the threshold value Th extracted from the selector 3. As a result, the binarizing circuit 7 outputs a binary image signal S2 obtained by adaptive binary quantization corresponding to the image type.

Note that the first threshold value Th1 is dynamically obtained by a dynamic threshold value calculator 8 in accordance with input image data S1 (to be described in detail later.

In the above-described arrangement, if a 4$\times$4 pixel region is set as a local region including a target pixel, and identification processing of an image type is executed by identifying section 2 by detecting the image characteristic of the target pixel, three line buffers cascade-connected to one through line are used as the line buffers 1. Identifying section 2 performs the following signal processing for image data S3 to S6 which are parallel input from line buffers 1 in the column direction in units of four pixels.

More specifically, identifying section 2 includes a maximum/minimum value detector 21 for calculating, from the image data S3 to S6 read out from the line buffers 1, the maximum density value Dmax and the minimum density value Dmin of the 4$\times$4 pixel local region, and outputting the calculation results as a maximum density signal S21 and a minimum density signal S22. In addition, section 2 includes a subtracter 22 for receiving the maximum and minimum density signals S21 and S22 from the maximum/minimum detector 21, for calculating, from the signals S21 and S22, a maximum density difference $\Delta$Dmax representing the difference between the maximum density Dmax and the minimum density Dmin, and for outputting it as a maximum density difference signal S23. The maximum density difference $\Delta$Dmax calculated by the maximum/minimum value detector 21 and the subtracter 22 is used as first feature data of the image of the local region in order to perform determination of the image region (to be described later).

An average value calculator 23 arranged in identifying section 2 calculates an average density value Da of the local region from the image data S3 to S6 read from line buffers 1, and outputs it as an average density signal S24. The average density value Da calculated by average value calculator 23 is used as second feature data of the image of the local region in order to perform determination of the image region (to be described later).

A divider 25 arranged in identifying section 2 calculates a normalized maximum density difference $\Delta$Dn (FTR) by dividing the maximum density difference signal S23 output as the first feature data by the average density signal S24 output as the second feature data, and outputs it as a normalized maximum density difference signal S25. This normalized maximum density difference FTR calculated by the divider 25 is used as an identification image characteristic feature amount for identifying the type of image data.

A determining section 24 arranged in identifying section 2 performs determination processing on the basis of the minimum density signal S22 supplied from the maximum/minimum value detector 21. If the minimum density Dmin of the predetermined local region including the target pixel is larger than a predetermined threshold value Thmin (to be described later), the determining section 24 determines that the possibility of the target pixel as a photographic pixel is high. In this case, the determining section 24 performs correction by adding feature data SF of the neighboring pixels which were weighted by a weighting section 28 to the normalized maximum density signal FTR as the identification image characteristic. The section 24 discriminates the correction result by using a predetermined threshold value Th0 so as to determine the type of image data of the local region (to be described in detail later). The section 24 then generates selection control signal S7 for determining a threshold value Th for binarizing image data S1 in accordance with the determination result and controls selector 3 to select a threshold value.

Figure 2:
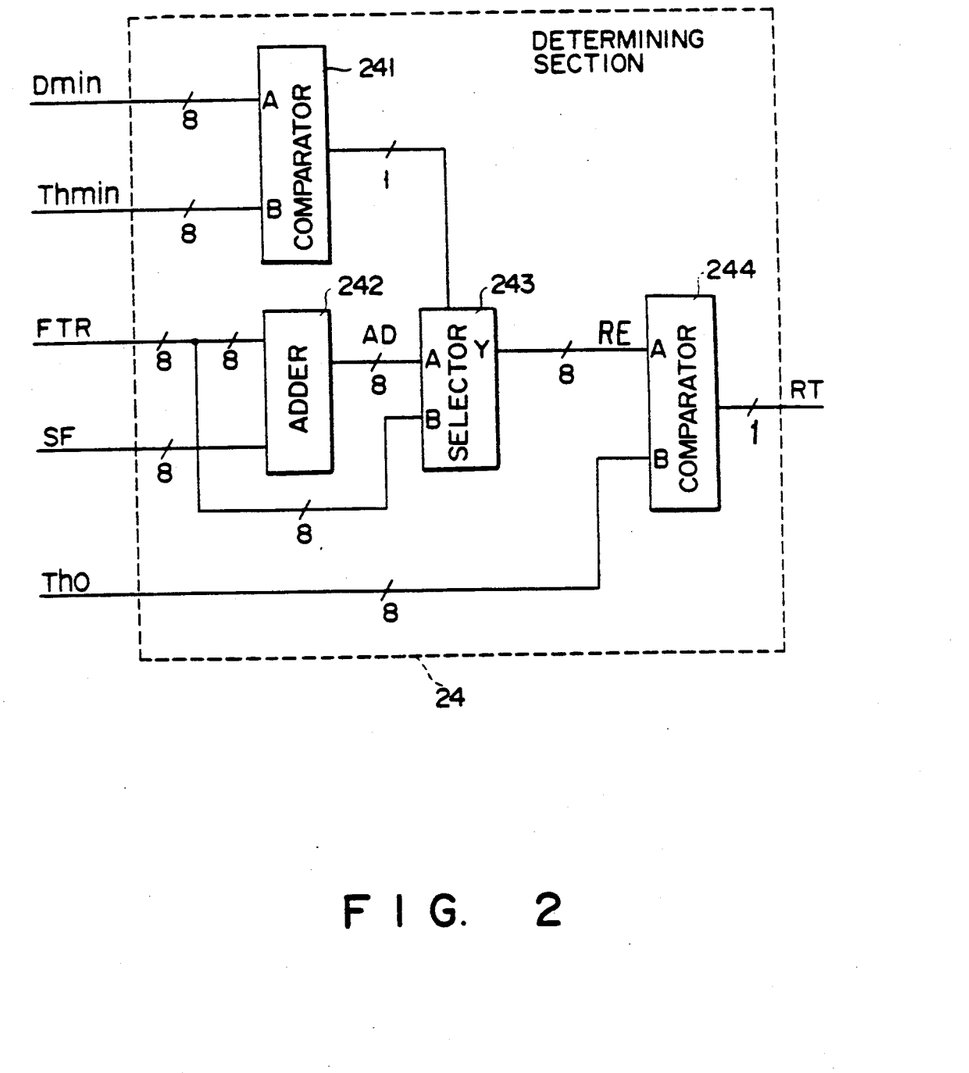
FIG. 2 is a block diagram showing a detailed arrangement of a determining section in FIG. 1.

As shown in FIG. 2, the determining section 24 comprises: an adder 242 for adding the feature data SF of the neighboring pixels to the normalized maximum density difference FTR; a first comparator 241 for comparing the minimum density Dmin with a predetermined threshold Thmin; a selector 243 for determining, on the basis of the comparison result from the first comparator 241, whether to select the output from the adder 242 or the normalized maximum density difference FTR; and a second comparator 244 for comparing the output from the selector 243 with the predetermined threshold value Th0.

The determining section 24 compares the minimum value Dmin detected by the maximum/minimum value detector 21 with a target pixel prediction threshold value Thmin by using the comparator 241. In addition, the section 24 causes the adder 242 to add the normalized maximum density difference FTR calculated by the divider 25 to the neighboring pixel feature data SF calculated by the weighting circuit 28. The selector 243 receives an addition result AD from the adder 242 and the normalized maximum density difference FTR, and selects the value AD or the value FTR in accordance with the comparison result from the comparator 241. If the comparison result from the comparator 241 is Dmin>Thmin, it is predicted that the possibility that a portion around the target pixel includes background pixels is low, and it is determined that the possibility of the target pixel as a photographic pixel is high. In contrast to this, if Dmin<Thmin, it is predicted that the possibility that the portion around the target pixel includes background pixels is high, and it is determined that the possibility of the target pixel as a character pixel is high. As a result, the selector 243 selects the value FTR as a image characteristic to which the feature data SF of the neighboring pixels is not added. The comparator 244 compares the image characteristic RE based on the value AD or FTR selected by the selector 243 with a character/photographic discrimination value Th0, thus discriminating the type of the target pixel.

Figure 9:
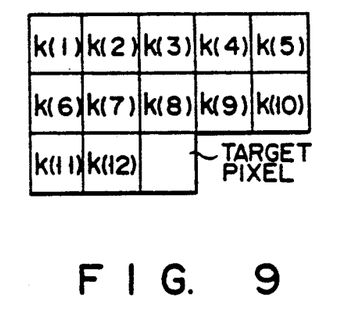
FIG. 9 is a view, showing the reference range of neighboring pixels, for explaining the operation of the present invention.

A neighboring pixel feature data calculator 26 arranged in identifying section 2 is constituted by line buffers 27 and a weighting circuit 28 so as to calculate the neighboring pixel feature data SF. The line buffers 27 serve to temporarily store the image type (character or photograph) already determined by the determining section 24. In this embodiment, a reference range of neighboring pixels is set to be a region shown in FIG. 9, which includes, e.g., pixels preceding the target pixel, more specifically, includes two preceding pixels and two succeeding pixels of each the preceding two lines with respect to positions corresponding to the target pixel position. Line buffers 27 are constituted by two line buffers cascade-connected to one through line. The weighting circuit 28 sequentially receives the type data of the neighboring pixels stored in the line buffers 27 in synchronism with predetermined clocks, and generates neighboring pixel feature signals S26 representing the feature data SF of the neighboring pixels which are weighted by the coefficients determined in accordance with the distances from the target pixel to the neighboring pixels (to be described in detail later).

The first feature data (maximum density difference ΔDmax) output from the subtracter 22 and the second feature data (average density Da) output from the average value calculator 23 are calculated in the following manner.

Figure 3:
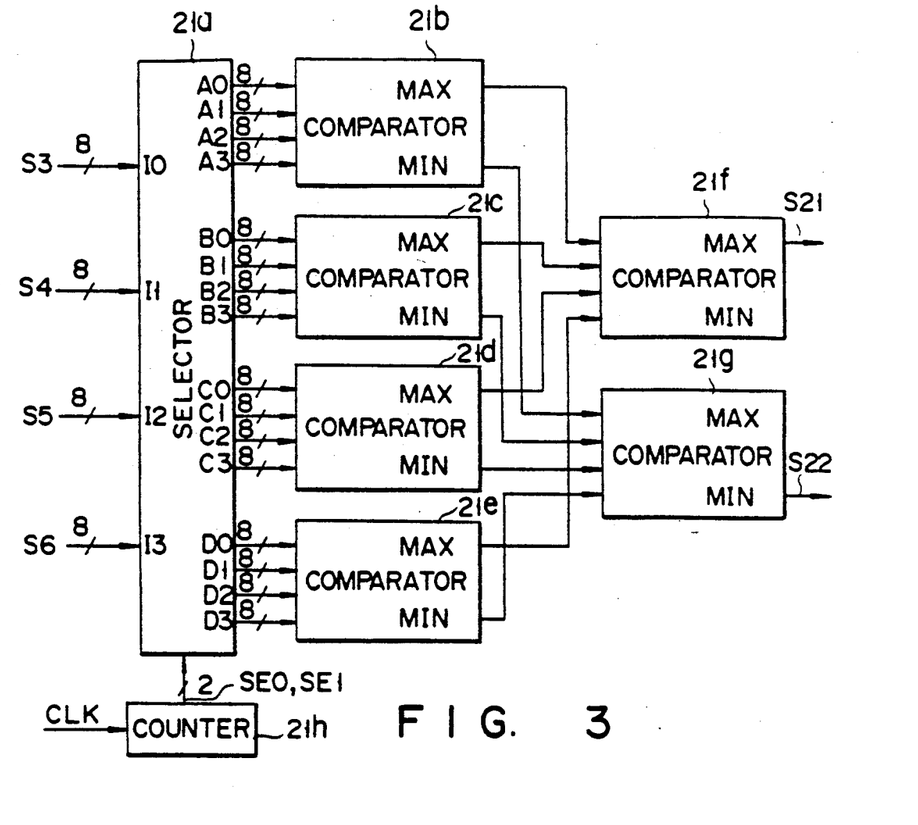
FIG. 3 is a block diagram showing a detailed arrangement of a maximum/minimum value detector in FIG. 1.
Figure 4:
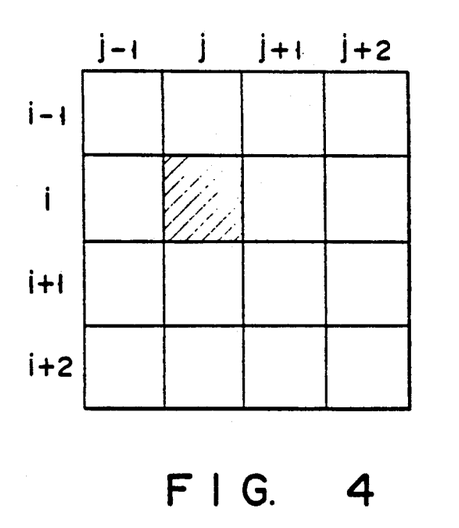
FIG. 4 is a view, showing a local region, for explaining an operation of the present invention.

FIG. 3 is block diagram showing an arrangement of the maximum/minimum value detector 21 arranged in the identifying section 2. The detector 21 calculates the maximum value Dmax and the minimum value Dmin of the densities in a 4×4 pixel region including the target pixel (hatched portion), as shown in FIG. 4.

Figure 6:
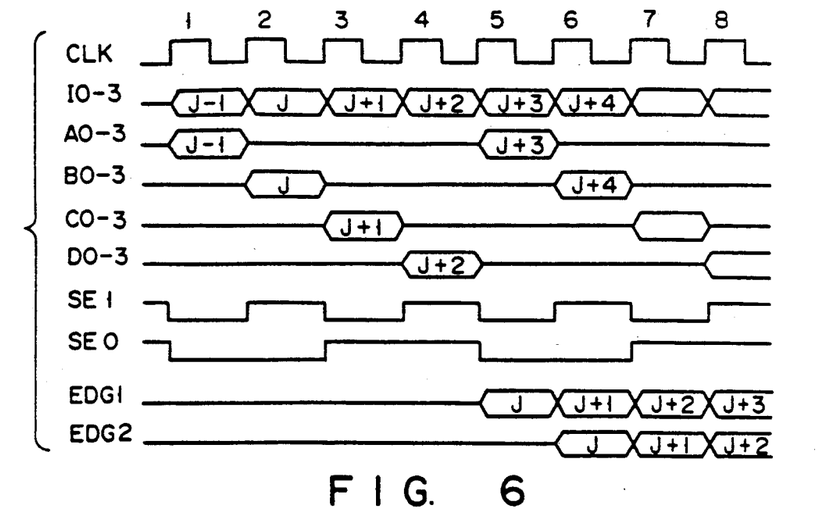
FIG. 6 is a timing chart for explaining the operation of the maximum/minimum value detector in FIG. 3.

The maximum/minimum value detector 21 sequentially distributes the image data S3 to S6 representing pixels each corresponding to 8 bits, which are sequentially supplied from line buffers 1 in units of four pixels in the column direction in synchronism with a clock CLK, to the comparators 21b, 21c, 21d, and 21e through a selector 21a, as indicated by a timing chart shown in FIG. 6. The distribution of the image data S3 to S6, which are input in units of columns, to the comparators 21b, 21c, 21d, and 21e is performed by the selector 21a in the following manner. For example, output terminals A0-3, B0-3, C0-3, and D0-3 (shown in FIG. 6) of the selector 21a are sequentially selected by selection signals SE0 and SE1 (shown in FIG. 6) from a counter 21h which is operated in response to the clock CLK received from an input terminal I0-3 so as to cause them to output the image data S3 to S6. Subsequently, the image data are compared with each other in the column direction in units of four pixels by the comparators 21b, 21c, 21d, and 21e so as to calculate the maximum and minimum densities of each column.

Second stage of comparators 21f and 21g receive the signals from the comparators 21b, 21c, 21d, and 21e at the timing of an edge signal EDG1 shown in FIG. 6, and compares the maximum and minimum values (respectively calculated in the column direction) with each other in the row direction, thus calculating the maximum and minimum values thereof.

By the above-described process, maximum density value Dmax and minimum density value Dmin in the 4×4 pixel region are calculated, and are output as maximum density signal S21 and minimum density signal S22 at the timing of an edge signal EDG2 shown in FIG. 6.

The subtracter 22 arranged in identifying section 2 calculates the maximum density difference ΔDmax, as the first feature data, from the calculated maximum density value Dmax and minimum density value Dmin according to equation (1):

$$\Delta Dmax = Dmax - Dmin \quad (1)$$

The maximum density difference ΔDmax as the first feature data is supplied to the divider 25.

Figure 7:
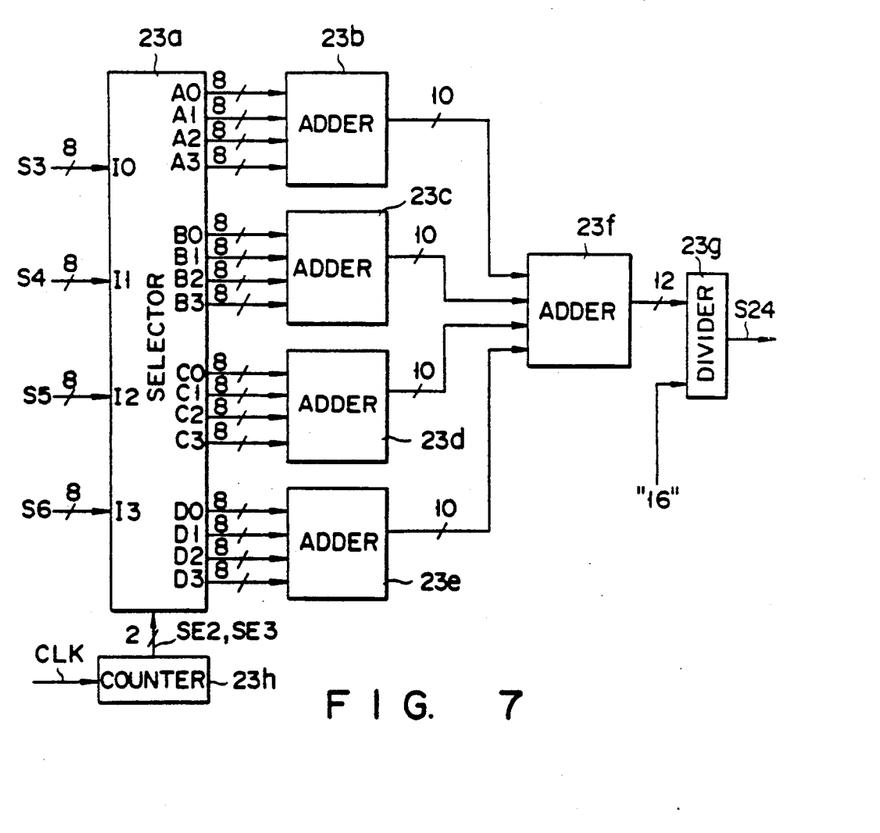
FIG. 7 is a block diagram showing a detailed arrangement of an average value calculator in FIG. 1.

The average value calculator 23 in identifying section 2 for calculating the average density value Da as the second feature data is designed in the following manner. Similar to the maximum/minimum value detector 21, the average value calculator 23 sequentially distributes image data S3 to S6 representing pixels each consisting of 8 bits, which are sequentially input from line buffers 1 in units of four pixels in the column direction in synchronism with the clock CLK, to adders 23b, 23c, 23d, and 23e through a selector 23a. The distribution of image data S3 to S6, which are input in units of rows, to the adders 23b, 23c, 23d, and 23e is performed by the selector 23a in such a manner that output terminals A0-3, B0-3, C0-3, and D0-3 of the selector 23a are sequentially selected by selection signals SE2 and SE3 from a counter 23h which is operated in response to the clock CLK shown in FIG. 6, thereby causing them to output image data S3 to S6. Subsequently, the image data are added in units of four pixels in the column direction by the adders 23b, 23c, 23d, and 23e, and the sum of image densities of the respective rows is output.

Adder 23f then adds the sums of density values of four pixels in the column direction throughout four lines respectively calculated by the adders 23b, 23c, 23d, and 23e, thus calculating the total sum of density values in the above-described 4×4 pixel local region Divider 23g divides this total sum by the number of pixels (16) constituting the local region, to calculate the average density Da of the local area as the second feature data.

The divider 25 shown in FIG. 1 divides the maximum density difference ΔDmax by the average density Da, and calculates the normalized maximum density difference Dn (FTR) according to equation (2):

$$\Delta Dn = \Delta Dmax/Da \quad (2)$$

Figure 8:
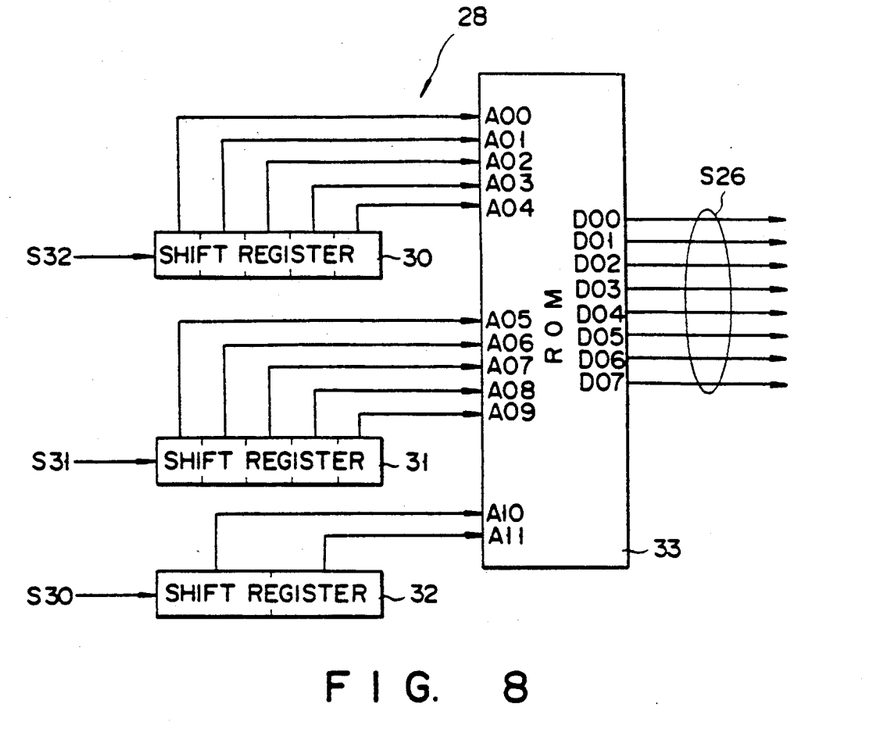
FIG. 8 is a block diagram showing an arrangement of a weighting circuit in FIG. 1.

FIG. 8 shows an arrangement of the weighting circuit 28. Each of shift registers 30 and 31 has a 5-bit serial-in/parallel-out function. The shift registers 31 and 30 are respectively used to store the determination result (type data) of the neighboring pixels of the second preceding line of the target pixel, and the determination result of the neighboring pixels of the immediately preceding line of the target pixel. A shift register 32 has a 2-bit serial-in/parallel-out function, and is used to store the determination result (type data) of a pixel immediately preceding the target pixel and of a pixel two pixels ahead of the target pixel. A neighboring pixel feature data generating ROM 33 receives the determination results (type data) of the neighboring pixels output from shift registers 30, 31, and 32, as address data, and outputs them as neighboring pixel feature signal S26 representing the feature data SF of the neighboring pixels prestored in accordance with the determination result of the neighboring pixels. The neighboring pixel feature data SF prestored in the ROM 33 are calculated by equation (3):

$$SF = \sum_{i} \{k(i) \times f(i)\} \quad (3)$$

Figure 10:
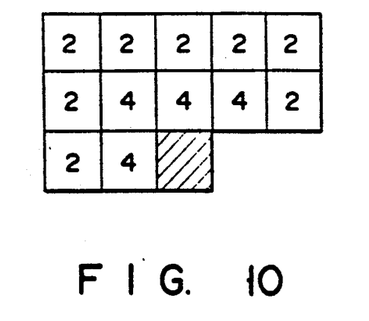
FIG. 10 is a view, showing weighting coefficients for weighting the neighboring pixels, for explaining the operation of the present invention.

In equation (3), k(i) is the coefficient of a neighboring pixel i, and values shown in FIG. 10 are used as coefficients in this embodiment. In addition, f(i) is a value to be determined in accordance with the determination result of the neighboring pixel. If it is determined that the neighboring pixel i is a character pixel, the value f(i) becomes "1". If it is determined that the pixel i is a photographic pixel, the value becomes "−1".

Figure 11A:
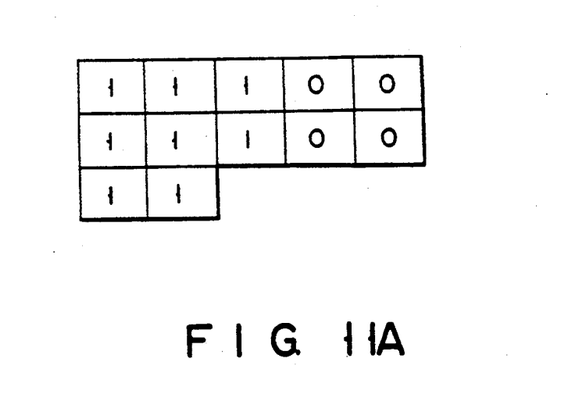
FIG. 11A is a view, showing a determination result of the neighboring pixels, for explaining the operation of the present invention.
Figure 11B:
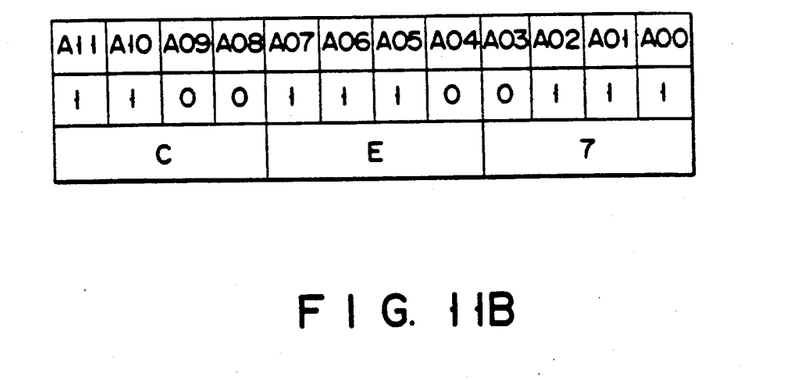
FIG. 11B is a view, showing addresses of a ROM in FIG. 8, for explaining the operation of the present invention.

The shift registers 30 and 31 receive character/photograph determination result (character: 1 photograph: 0). If a determination result of neighboring pixels shown in FIG. 11A is obtained, a corresponding address of the ROM 33 in the weighting circuit 28 becomes 7EC [Hex], as shown in FIG. 11B.

The corresponding data in the ROM 33 is the total sum SF obtained by adding multiplication results which are obtained by multiplying the weighting coefficient k(i) by the value f(i) which becomes "1" when it is determined that the determination result of a neighboring pixel is a character pixel (=1) and becomes "−1" when it is determined that a neighboring pixel is a photographic pixel (=0).

According to equation (3), when the address of the ROM 33 is 7EC [Hex], the data SF is obtained as follows:

$$\begin{aligned} SF &= (1 \times 2) + (1 \times 2) + (1 \times 2) + (-1 \times 2) \times \\ &\quad (-1 \times 2) + (1 \times 2) + (1 \times 4) + (1 \times 4) + \\ &\quad (-1 \times 4) \times (-1 \times 2) + (1 \times 2) + (1 \times 4) \\ &= 12 \end{aligned}$$

In addition, the most significant bit D07 of data (D00–D07) of the ROM 33 is a sign bit.

The determining section 24 (see FIG. 2) discriminates a correction value RE, which is obtained by selectively adding the neighboring pixel feature data SF to the normalized maximum density difference FTR, thereby determining an image type. The determination conditions are:

$$RE > Th0 \quad (4)$$

$$RE \leq Th0 \quad (5)$$

If equation (4) is satisfied, the determining section 24 determines that the target pixel is a character pixel and outputs "1". If equation (5) is satisfied, the section 24 determines that the target pixel is a photographic pixel, and outputs "0". In determination of a given target pixel, if it is determined that all the neighboring pixels are photographic pixels, the neighboring pixel feature data SF takes a negative value. For this reason, the value of the left-hand side of each of equations (4) and (5) becomes smaller than the normalized maximum density difference ΔDn, and hence the possibility that equation (5) is satisfied becomes high. That is, it tends to be determined that the target pixel is a photographic pixel.

Note that the first threshold value Th1 to be selected by the selector 3 in accordance with such a determination result is generated by the dynamic threshold value detector 8 in accordance with its image data. More specifically, a threshold value Bh for binarizing the image data S1 is dynamically calculated in accordance with the maximum density value Dmax and the minimum density value Dmin calculated by the maximum/minimum value detector 21, as follows:

$$Bh = (Dmax + Dmin)/2 \quad (6)$$

and the obtained threshold value Bh is stored in the first threshold value memory 4.

Figure 5:
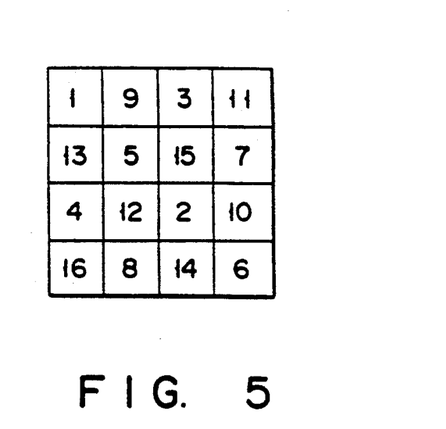
FIG. 5 is a view showing a dither pattern used in the present invention.

In contrast to this, the second threshold value Th2 for binarizing a photographic portion is given as, e.g., dither pattern data (dither matrix) shown in FIG. 5, and is stored in the second threshold value memory 5. One of these threshold values Bh (first threshold value Th1) and the threshold value (second threshold value Th2) represented by the dither pattern is selected by the selector 3 on the basis of the determination result from the determining section 24 so as to be used as a binarization threshold value Th of the image data S1.

As described above, the present invention is based on the fact that in a document on which different types of images, such as characters and photographs, are formed together, it is rare for photographic portions to be dispersed in small units, but they tend to gather in a predetermined region on the document. More specifically, in the present invention, the neighboring pixel feature data calculator 26 weights pixels, which are neighboring pixels of a target pixel and which have been already discriminated as character or photographic pixels, by coefficients determined in accordance with the distances from the target pixel to the neighboring pixels, thus obtaining the calculation result as the feature data SF of the neighboring pixels. Furthermore, in the present invention, the normalized maximum density difference Dn is obtained by dividing the maximum density difference ΔDmax, which is obtained by subtracting the minimum density Dmin from the maximum density Dmax which are calculated by the maximum/minimum value calculator 21, by the average density Da obtained by the average calculator 23, and the feature amount obtained by correcting the normalized maximum density difference FTR, as the image characteristic of the target pixel, by using the neighboring pixel feature data SF, is discriminated by using the predetermined threshold value Th0, thus determining the image type of the target pixel. According to the present invention, the threshold value Th for binarizing the image data of the target image is determined on the basis of the determination result, and the image data of the target image is binarized by the determined threshold value. Therefore, the present invention can eliminate the drawback of the conventional method using only the maximum density difference ΔDmax, i.e., the drawback that pixels including, in a predetermined area, a region in which a change in density is large (e.g., a profile portion of a face) are erroneously determined.

That is, in the present invention, since an image type is determined by referring to not only feature data of a local area but also to an identification result of its neighboring pixels, even the image type of a pixel which is erroneously determined if only feature data is used can be reliably identified. Therefore, in the present invention, different types of images, such as character and photographic portions, can be accurately determined. That is, when a document image including a plurality of types of data is to be processed, character portions can be binarized at a high resolution, and photographic portions can be binarized to preserve its gradation.

If identification is performed by using the maximum density difference ΔDmax in a predetermined local area as a image characteristic, the background area of a photographic image is mistaken for a photographic portion. Since many background pixels discriminated as photographic pixels are present around a character portion, if identification of the character portion is performed by adding the determination result of the neighboring pixels to the feature data of the target pixel, even an edge portion of the character portion may be erroneously discriminated as a photographic portion. For this reason, in the present invention, identification processing by adding the determination result of the neighboring pixels is not performed for a pixel determined to have a high possibility as a character image, but is performed only for a pixel determined to have a high possibility as a photographic image. This operation can prevent an edge portion of a character image from being erroneously discriminated as a photographic portion. In this case, preliminary determination whether the possibility that the target pixel is a character pixel is high or the possibility that the target pixel is a photographic pixel is high is performed in the following manner. In a character image, since most pixels around an edge region are background pixels, the minimum density in a predetermined area is small. When the minimum density in the predetermined area is smaller than a predetermined threshold value, it is determined, on the basis of this fact, that a background portion of the document is present within the predetermined area, thus predicting a high possibility of the target pixel as a character pixel. In contrast to this, if the minimum density in the predetermined area is larger than the predetermined threshold value, it is determined that no background portion is present within the predetermined area, thus predicting a high possibility of the target pixel as a photographic pixel. Since identification processing by adding the determination result of neighboring pixels is performed only for photographic pixels which gather in the form of blocks, erroneous determination of photographic portions can be restricted, and accurate identification of character and photographic portions can be performed.

The present invention is not limited to the abovedescribed embodiment. For example, the region of the predetermined area is not limited to a 4×4 pixel region, but can be variably set in accordance with a target image to be processed. Similarly, the reference region of neighboring pixels is not limited to the region shown in FIG. 9. In addition, various modifications of the means for adaptively generating threshold values can be made. A dither pattern used for binarization of a photographic portion is not limited to the one shown in FIG. 5. The size of the dither matrix is not limited to a specific value. Furthermore, the threshold value of the dither pattern is not determined by a dot dispersion type arrangement, but by a dot concentration type arrangement.

In addition, in the embodiment, a maximum density difference normalized by an average density in a predetermined area is used as feature data. Such feature data is used to identify an image having low contrast with its background portion, e.g., a document written with a pencil or a newspaper document, as a character portion. However, the feature data is not limited to this. Moreover, in the present invention, the value of a feature amount and a determination threshold value are calculated on the basis of an amount corresponding to the reflectance of image signals, i.e., image data read by the read unit. However, such calculations may be performed on the basis of a value obtained by converting this amount into an image density (logarithm of the reciprocal number of the reflectance). Alternatively, identification processing may be performed on the basis of conversion signals formed in consideration of human visual properties.

As has been described above, according to the present invention, there is provided an image data processing apparatus and method in which when image data including different types of images are to be processed by binary quantization, image regions can be accurately separated by eliminating a determination error with respect to a region having a large variation in density in halftone image regions such as photographic images, and binary quantization can be adaptively and accurately performed in accordance with the feature of each image, thereby contributing to obtain a reproduced image which satisfies both the resolution of image regions having contrast, such as character portions, and the gradation of image regions having gradation, such as photographic portions.

Additional advantages and modifications will readily occur to those skilled in the art. Therefore, the invention in its broader aspects is not limited to the specific details, representative devices, and illustrated examples shown and described. Accordingly, departures may be made from such details without departing from the spirit or scope of the general inventive concept as defined by the appended claims and their equivalents.

What is claimed is:

1. An apparatus for processing image data having a plurality of pixels, said plurality of pixels including a character pixel and a photograph pixel, said apparatus comprising:

calculating means for obtaining, from the image data, density-difference data representing a density difference between pixels comprising a local region including a specified one of said pixels designated as a target pixel;

discriminating means for initially discriminating whether, in accordance with the density-difference data, the target pixel is more likely to be a character pixel or a photograph pixel;

correcting means for correcting the density-difference data in accordance with a respective distance between the target pixel and each one of a plurality of pixels proximate to the target pixel, whereby said correcting means, upon a discrimination that the target pixel is likely to be a photograph pixel, applies a first correcting coefficient to a first group of pixels proximate to the target pixel and a second correcting coefficient to a second group of pixels proximate to said first group, said first correcting coefficient being greater than said second correcting coefficient;

determining means for generating an output indication indicating whether the target pixel is a character pixel or a photograph pixel in accordance with the corrected density-difference data; and binarizing means for adaptively binarising the target pixel in accordance with a threshold value selected in accordance with said output indication of said determining means.

2. An apparatus according to claim 1, wherein said calculating means comprises:

means for temporarily storing the image data in units comprising a plurality of lines whereby said local region including the target pixel is established;

first density calculating means for calculating a maximum and a minimum density value for pixels comprising said local region; and second density calculating means for calculating a maximum density difference between said maximum density value and said minimum density value.

3. An apparatus according to claim 2, wherein said calculating means further comprises:

third density calculating means for calculating an average density value for said pixels comprising said local region; and means for normalizing said maximum density value by said average density value.

4. An apparatus according to claim 2, wherein said discriminating means comprises means for discriminating between said character pixel and said photograph pixel by comparing said minimum density value to a predetermined reference value.

5. An apparatus according to claim 2, wherein said correcting means comprises:

accumulating means for temporarily accumulating determination results corresponding to a plurality of lines obtained from said calculating means whereby a predetermined range of the neighboring pixels is selected with respect to said target pixel; and weighting value storage means for providing weighting values corresponding to a respective distance between said target pixel and each one of said neighboring pixels and storing said weighting values in accordance with an output from said accumulating means.

6. An apparatus according to claim 2, said apparatus further comprising:

means for dynamically calculating a first threshold value in accordance with said maximum density value and said minimum density value;

first memory means for said first threshold value; and second memory means for storing a second threshold value; wherein the target pixel is binarized in accordance with said threshold value selectively read from said first memory means and said second memory means in accordance with said determination by said determining means.

7. An apparatus according to claim 6, wherein said apparatus further comprises means for synchronizing a timing of supplying, to said binarizing means, the first or second threshold value with respect to the target pixel determined by said determining means with a timing of supplying the image data including the target pixel from said storing means.

8. An apparatus according to claim 5, said apparatus further comprising:

adding means for adding said maximum density difference calculated by said second density calculating means to an output from said correcting means; and selector means for selecting an output from said adding means and the maximum density difference calculated by said second density calculating means in accordance with a discrimination result from said discriminating means.

9. An apparatus according to claim 2, wherein said storing means includes a plurality of line buffer means.

10. An apparatus according to claim 2, wherein said first density calculating means comprises:

a selector for distributing the image data of the plurality of lines in units comprising a plurality of rows;

a plurality of column direction comparators for comparing the image data with each other in the column direction, the image data being distributed in units comprising the plurality of rows by said selector, and for outputting a maximum density value and a minimum density value of each column; and first and second row direction comparators for comparing the maximum and minimum density values in the column direction from said plurality of column direction comparators with each other in the row direction, and for outputting the comparison results as maximum and minimum density values of the local region.

11. An apparatus according to claim 3, wherein said third density calculating means comprises:

a selector for distributing the image data of the plurality of lines in units of a plurality comprising rows;

a plurality of column direction adders for adding the image data, which are distributed in units of the plurality of rows by said selector, in units of a plurality of pixels in the column direction, and for outputting total density values of the pixels of each row;

a row direction adder for adding the total density values of the rows from said plurality of column direction adders in the row direction, and for outputting an addition result as a total density value of the local region; and a divider for outputting the average density value by dividing the total density value of the local region from said row direction adder by the total number of pixels in the local region.

12. An apparatus according to claim 6, wherein said dynamically calculating means comprises means for calculating the first threshold value (Bh) by $$Bh=(Dmax+Dmin)/2$$

where Dmax and Dmin are the maximum density value and minimum density value, respectively, which are calculated by said first calculating means.

13. An apparatus according to claim 6, wherein the second threshold value stored in said second memory means includes a dither matrix.

14. An apparatus according to claim 7, wherein said binarizing means comprises means for comparing the first or second threshold value with the image data.

15. An apparatus according to claim 5, wherein said accumulating means comprises a plurality of shift registers, and
said weighting value storage means comprises a read-only memory for outputting the stored weighting values by using outputs from said plurality of shift registers as address data.

16. An apparatus according to claim 10, said apparatus further comprising:
means for selecting a threshold value for binarizing image data corresponding to the target pixel in accordance with the determination of whether the target pixel is a character pixel or a photograph pixel; and
means for binarizing the image data corresponding to the target pixel in accordance with the threshold value selected by said determining means.

17. A method of processing image data having a plurality of pixels, said plurality of pixels including a character pixel and a photograph pixel used as a target pixel, said method comprising the steps of:
calculating, from the image data, density-difference data representing a density difference between pixels comprising a local region including the target pixel;
discriminating whether, in accordance with the density-difference data, the target pixel is likely to be a character pixel or a photograph pixel;
correcting the density-difference data in accordance with a respective distance between the target pixel and each one of a plurality of pixels proximate the target pixel, when the target pixel is discriminated likely to be a photograph pixel, by applying a first correcting coefficient to a first group of pixels proximate the target pixel and by applying a second correcting coefficient to a second group of pixels proximate said first group, said first correcting coefficient being greater than said second correcting coefficient;
determining, in accordance with the corrected density-difference data, whether the target pixel is a character pixel or a photograph pixel; and
adaptively binarizing the target pixel by using a threshold value selected in accordance with said determination of whether the target pixel is a character pixel or a photograph pixel.

18. An apparatus for processing image data having a plurality of pixels, said plurality of pixels including a character pixel and a photograph pixel used as a target pixel, said apparatus comprising:
calculating means for obtaining from the image data, at least first data and second data representing, respectively, the lowest density and the highest density for pixels comprising a local region including the target pixel;
discriminating means for discrimination, in accordance with the first data, whether the target pixel is likely to be a character pixel or a photograph pixel;
correcting means for correcting the second data in accordance with a respective distance between the target pixel and each one of a plurality of pixels proximate the target pixel, whereby said correcting means upon a discrimination that the target pixel is likely to be a photograph pixel apply first correcting coefficient to a first group of pixels proximate the target pixel and a second correcting coefficient to a second group of pixels proximate the first group, said first correcting coefficient being greater than said second correcting coefficient;
determining means for determining whether, in accordance with the corrected second data, the target pixel is a character pixel or a photograph pixel; and
binarizing means for adaptively binarizing the target pixel in accordance with a threshold value selected in accordance with the determination of whether the target pixel is a character pixel or a photograph pixel.

19. An apparatus for processing image data having a plurality of pixels, said plurality of pixels including a character pixel and a photograph pixel used as a target pixel, said apparatus comprising:
calculating means for obtaining, from the image data, density-difference data representing a density difference between pixels comprising a local region including the target pixel;
discriminating means for discriminating whether, in accordance with the density-difference data, the target pixel is likely to be a character pixel or a photograph pixel;
correcting means for correcting the density-difference data in accordance with a respective distance between the target pixel and each one of a plurality of pixels proximate the target pixel, whereby said correcting means, upon a discrimination that the target pixel is likely to be a photograph pixel, applies a first correcting coefficient to a first group of pixels proximate the target pixel and a second correcting coefficient to a second group of pixels proximate said first group, said first correcting coefficient being greater than said second correcting coefficient; and
determining means for determining whether the target pixel is a character pixel or a photograph pixel in accordance with the corrected density-difference data.

* * * * *

UNITED STATES PATENT AND TRADEMARK OFFICE
CERTIFICATE OF CORRECTION

PATENT NO.   :   5,109,436
DATED        :   April 28, 1992
INVENTOR(S)  :   Hironobu Machida et al.

It is certified that error appears in the above-identified patent and that said Letters Patent is hereby corrected as shown below:

Claim 1, column 13, line 19, change "binarising" to --binarizing--.

Claim 16, column 15, line 18, change "claim 10" to --claim 19--.

Claim 18, column 16, line 16, after "apply" insert --a--.

Signed and Sealed this

Twenty-sixth Day of October, 1993

Attest:

BRUCE LEHMAN

*Attesting Officer*   Commissioner of Patents and Trademarks